US008662257B2

(12) United States Patent
Chasteen (10) Patent No.: US 8,662,257 B2
(45) Date of Patent: Mar. 4, 2014

(54) ELEVATOR CAB ACCESSORY CONTROL DEVICE

(76) Inventor: Calvin Michael Chasteen, Cincinnati, OH (US)

( * ) Notice: Subject to any disclaimer, the term of this patent is extended or adjusted under 35 U.S.C. 154(b) by 380 days.

(21) Appl. No.: 13/008,138

(22) Filed: Jan. 18, 2011

(65) Prior Publication Data

US 2012/0181116 A1   Jul. 19, 2012

(51) Int. Cl.
  *B66B 1/34* (2006.01)
(52) U.S. Cl.
  USPC .......................................... 187/392; 187/316
(58) Field of Classification Search
  USPC .......... 187/247, 290, 391–397, 413; 700/295, 700/297; 307/39
  See application file for complete search history.

(56) References Cited

U.S. PATENT DOCUMENTS

| 788,539 | A | | 5/1905 | Klopf | |
|---|---|---|---|---|---|
| 3,110,879 | A | | 11/1963 | Nikazy | |
| 4,698,748 | A | * | 10/1987 | Juzswik et al. | 713/322 |
| 5,127,575 | A | * | 7/1992 | Beerbaum | 236/46 R |
| 5,145,247 | A | | 9/1992 | Mandy | |
| 5,237,169 | A | * | 8/1993 | Grehant | 250/214 AL |
| 5,412,542 | A | | 5/1995 | Mandy | |
| 6,147,620 | A | | 11/2000 | Remmers et al. | |
| 6,681,899 | B1 | * | 1/2004 | Hong | 187/391 |
| 6,801,836 | B2 | * | 10/2004 | Schanin | 700/295 |
| 8,160,749 | B2 | * | 4/2012 | Donaldson et al. | 700/276 |
| 8,249,731 | B2 | * | 8/2012 | Tran et al. | 700/94 |
| 2003/0192746 | A1 | * | 10/2003 | Suzuki | 187/391 |
| 2004/0188182 | A1 | * | 9/2004 | Walters et al. | 187/247 |
| 2007/0069657 | A1 | | 3/2007 | Tuttle et al. | |
| 2007/0295566 | A1 | | 12/2007 | Lindegger | |
| 2010/0066248 | A1 | | 3/2010 | Mattila et al. | |
| 2010/0187832 | A1 | * | 7/2010 | Holland et al. | 290/1 A |
| 2011/0251725 | A1 | * | 10/2011 | Chan | 700/277 |
| 2012/0181117 | A1 | * | 7/2012 | Chasteen | 187/392 |

FOREIGN PATENT DOCUMENTS

| JP | 04-277175 | 10/1992 |
|---|---|---|
| JP | 07-041258 | 2/1995 |
| JP | 07-247060 | 9/1995 |
| JP | 07-315699 | 12/1995 |
| JP | 08-073133 | 3/1996 |
| JP | 08-231139 | 9/1996 |
| JP | 08-245090 | 9/1996 |

(Continued)

OTHER PUBLICATIONS

Wurtec (Exclusive U.S. Distributor for Henning GMBH Products); Henning LIGHT Watcher; http://wurtec.com/; (no date); page 1.

(Continued)

*Primary Examiner* — Anthony Salata
(74) *Attorney, Agent, or Firm* — Hasse & Nesbitt LLC; W. Charles Ehlers; Donald E. Hasse (57) ABSTRACT

An elevator cab accessory device having a control panel having a first timer and a first contactor, whereby the first timer operates the first contactor, an elevator door position sensor communicating with the first timer, and an occupant sensor communicating with the first timer, wherein the first timer operation is controlled by the elevator door position sensor and the occupant sensor, and a first elevator cab accessory communicating with the first contactor, whereby the first elevator cab accessory operation is controlled by the first contactor. A method for controlling elevator accessories and a method for installing an elevator cab accessory device.

20 Claims, 5 Drawing Sheets

(56) References Cited

FOREIGN PATENT DOCUMENTS

| | | |
|---|---|---|
| JP | 11-071078 | 3/1999 |
| JP | 2004-196491 | 7/2004 |
| JP | 2005-255371 | 9/2005 |
| JP | 2005-272073 | 10/2005 |
| JP | 2007-084228 | 4/2007 |
| JP | 2008-189421 | 8/2008 |

OTHER PUBLICATIONS

ThyssenKrupp Elevator, Americas Business Unit; "Sustainable Solutions for Existing Elevators and Escalators" version 09.09; Copyright ©2009 ThyssenKrupp Elevator Corporation; p. 1-4.

Calvin Michael Chasteen U.S. Appl. No. 13/351,047, filed Apr. 16, 2012.

* cited by examiner

ELEVATOR CAB ACCESSORY CONTROL DEVICE

FIELD OF THE INVENTION

This invention relates to an elevator cab accessory control device for controlling the operation of elevator accessories. This invention further relates to a method for controlling elevator accessories and a method for installing an elevator cab accessory device.

BACKGROUND OF THE INVENTION

Elevators cabs often contain accessories that run continuously, 24 hours a day 7 days a week. These accessories typically include at least one light for illuminating the interior space of the elevator cab and at least one fan for ventilating the cab. The elevator light and fan may run overnight or for an entire weekend even though the elevator is not used during that period.

Automatically shutting off the light and fan when the elevator is not in use and restarting the light and fan only when needed can save substantial energy. Additionally, an add-on elevator cab accessory control device that does not require a technician to sort through the many wires in the existing elevator control system can lead to an easier, safer and less expensive installation.

SUMMARY OF THE INVENTION

This invention relates to an elevator cab accessory device comprising a control panel having a first timer and a first contactor, whereby the first timer operates the first contactor, an elevator door position sensor communicating with the first timer, and an occupant sensor communicating with the first timer, wherein the first timer operation is controlled by the elevator door position sensor and the occupant sensor, and a first elevator cab accessory communicating with the first contactor, whereby the first elevator cab accessory operation is controlled by the first contactor.

The invention also relates to a method for controlling at least one elevator cab accessory, comprising receiving an elevator door closed signal from an elevator door position sensor, receiving an empty elevator signal from an occupant sensor, starting a first timer upon receiving the elevator door closed signal from the elevator door position sensor and the empty elevator signal from the occupant sensor, and turning off a first elevator cab accessory after the first timer has counted a predetermined amount of time while continuing to receive the elevator door closed signal and the empty elevator signal.

This invention further relates to a method of installing a controller for at least one elevator cab accessory comprising affixing a control panel having a first timer to an elevator cab, affixing an elevator door position sensor to an elevator cab and wiring the elevator door position sensor to the control panel, affixing an occupant sensor to an elevator cab and wiring the occupant sensor to the control panel, providing a wire to the control panel for powering the control panel and at least one elevator cab accessory, and wiring the at least one elevator cab accessory to the control panel.

DETAILED DESCRIPTION

Figure 1:
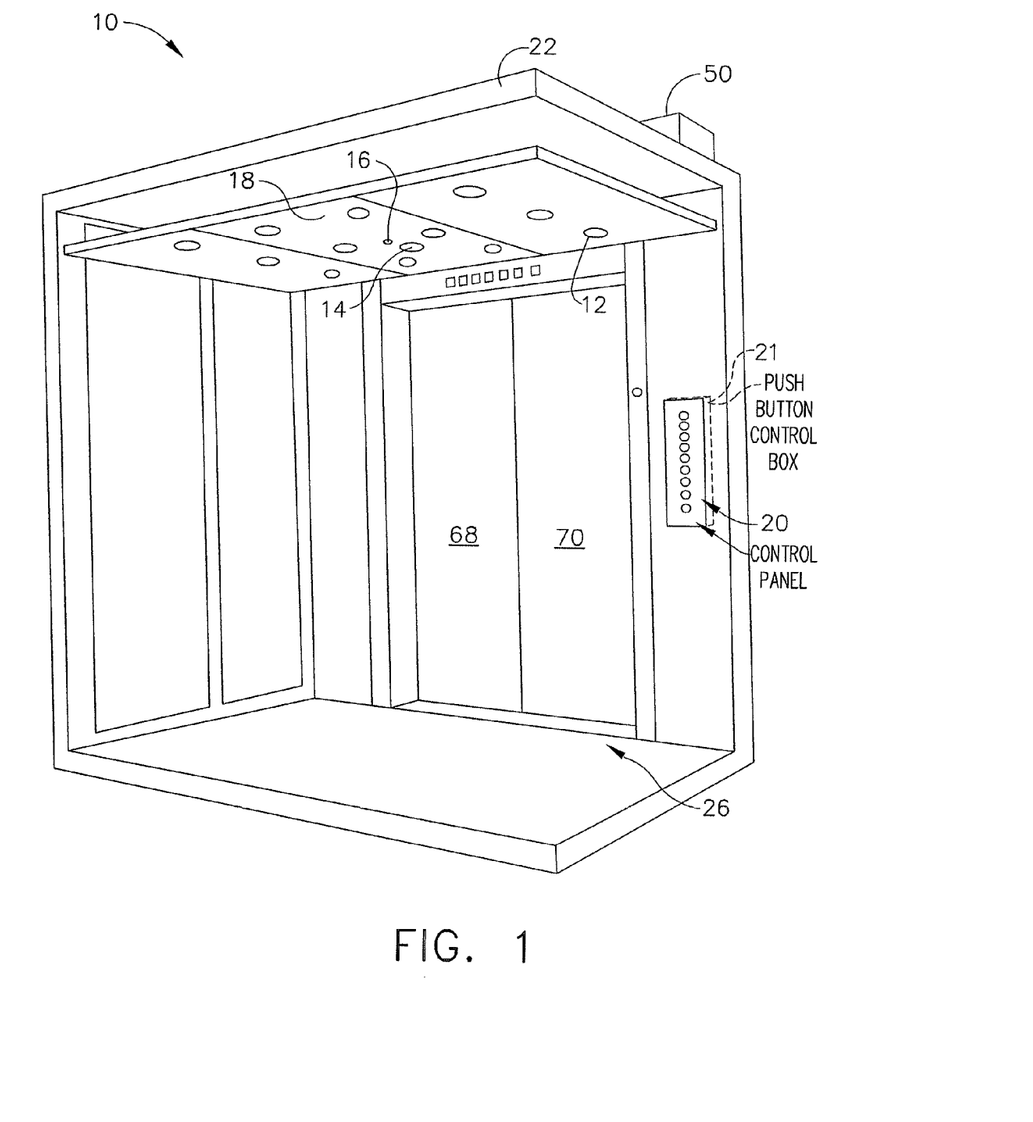
FIG. 1 is a drawing of an elevator cab showing an occupant sensor according to the invention.

FIG. 1 shows an elevator cab 10 having at least one light 12, fan 14, occupant sensor 16, and elevator door opening mechanism 50. The cab 10 has a structural frame 22, a ceiling 18, an interior space 26, a pushbutton control panel 20, and elevator doors 68 and 70. Exterior elevator doors corresponding to the elevator doors 68 and 70 are typically located at the elevator stops where a user enters and exits the elevator. A pushbutton control panel box 21 is located behind the pushbutton control panel 20.

Figure 2:
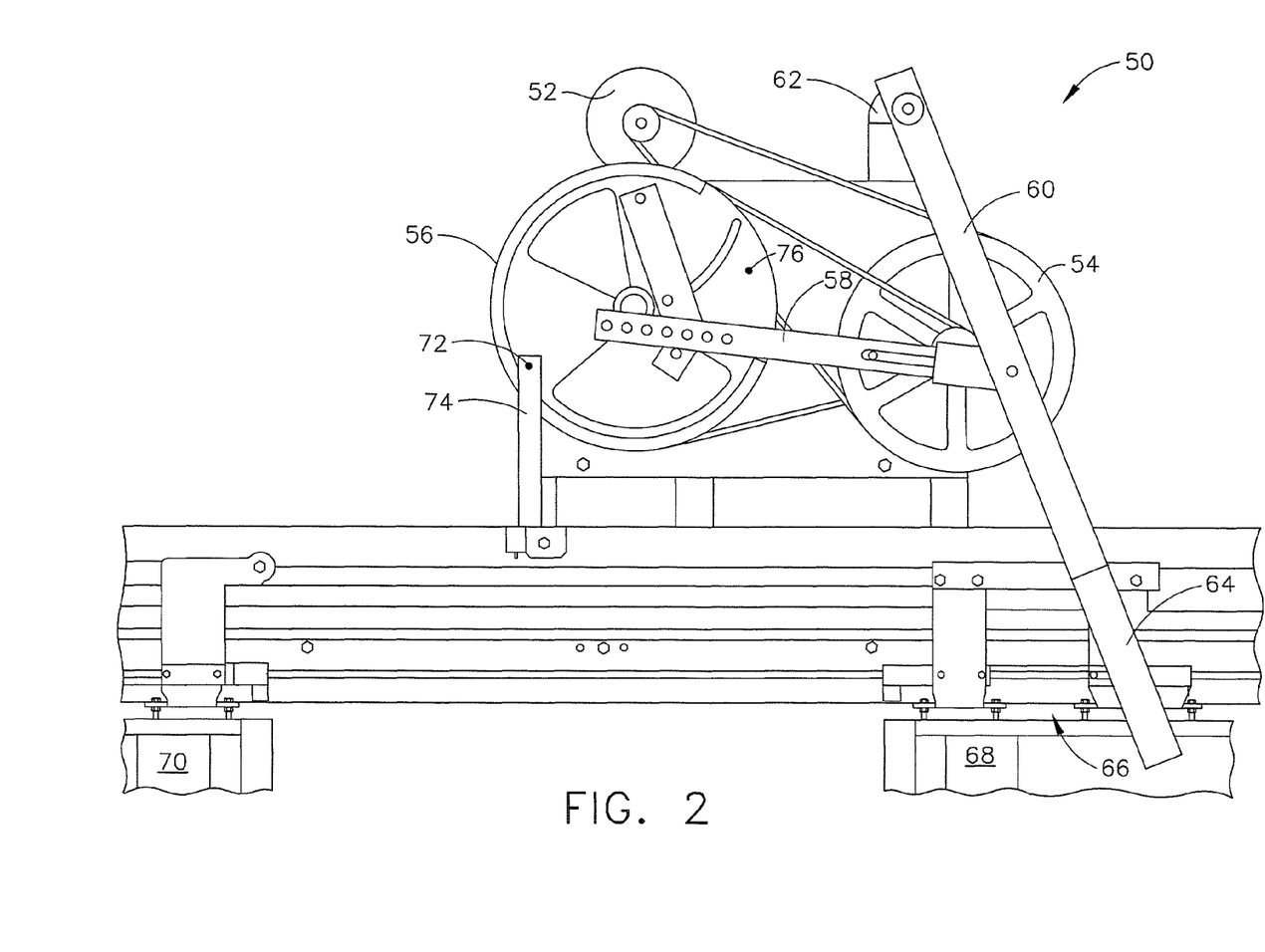
FIG. 2 is a drawing of an elevator door opening mechanism showing an elevator door position sensor according to the invention.

FIG. 2 shows a typical elevator door opening and closing mechanism 50 having a motor 52, a jack shaft sheave 54, and a drive wheel 56. In the position shown in FIG. 2, the elevator door opening and closing mechanism is holding the elevator doors 68 and 70 in the open position. The drive wheel 56 is connected to an intermediate arm 58 that rotates a drive arm 60 about a drive arm support 62. A connecting arm 64 is tied to the drive arm and operates the elevator door hanger assembly 66. The elevator doors 68, 70 are attached to the elevator door hanger assembly 66, which supports the elevator doors and allows them to slide open and close.

An Elevator Cab Accessory Device ("ECAD") utilizes sensors and accessory controls. An elevator door position sensor 72 is affixed to a support 74. The elevator door position sensor 72 is activated by a corresponding sensor activator 76 affixed to the drive wheel 56. When the elevator doors are closed, the elevator door position sensor is aligned with the sensor activator, resulting in the elevator door position sensor transmitting an elevator door closed signal. When the elevator doors are not closed, the sensor activator 76 is not aligned with the elevator door position sensor, thereby resulting in the elevator door position sensor 72 transmitting an elevator door open signal.

A limit switch, rocker switch, proximity sensor, or other sensor may be used to determine whether the elevator doors are open or closed. Additionally, the elevator door position sensor may be located on other parts of the elevator to determine whether the elevator doors are open or closed. For example, to determine whether the elevator doors are closed, the elevator door position sensor could sense the position of the jack shaft sheave 54, the intermediate arm 58, the drive arm 60, the connecting arm 64, the elevator door hanger assembly 66 or the elevator doors 68 and 70. A sensor for directly sensing the position of the elevator doors can be used with linear door operators, which typically do not have the type of door opening and closing mechanism shown in FIG. 2. Additionally, depending on the type of sensor utilized, the elevator door position sensor may sense only when the elevator doors are fully closed, or it may sense any position of the elevator doors, including open, closed, or any position therebetween.

The occupant sensor 16 senses whether an occupant is in the elevator cab interior space 26. The occupant sensor 16 may be a passive infrared sensor, an active infrared sensor, a time of flight camera, an ultrasonic sensor, a camera with imaging processing or other sensor that would detect an occupant. If the ambient temperature in the interior space 26 of the elevator is too hot, then an infrared detector may not be able to detect an occupant. In that situation, a sensor other than an infrared detector, such as a camera with time of flight technology, an ultrasonic sensor, or a camera with imaging processing may be desired. One camera with time of flight technology is the IMS100 manufactured by CEDES. When an occupant is in the elevator cab interior space 26, the occupant sensor transmits an occupied signal. When the elevator cab interior space is unoccupied, the occupant sensor transmits an empty elevator signal. The signals are typically discrete signals. Thus, the occupied signal may be an open circuit and the empty elevator signal may be a closed circuit, or vice versa. Alternatively, the occupied signal may result in an electrical transmission while the empty elevator signal results in no electrical transmission, or vice versa. Other types of signaling may also be used.

Figure 3:
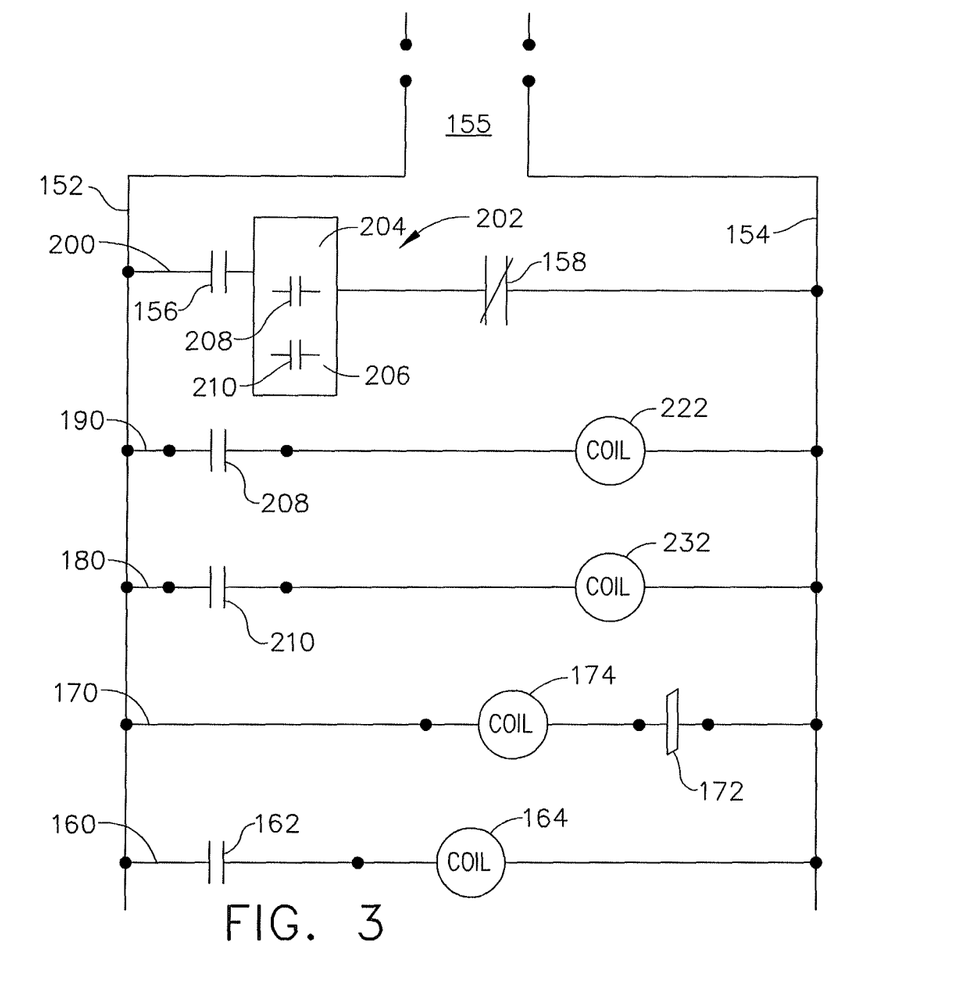
FIG. 3 is a ladder diagram of the electrical control system according to the invention.

FIG. 3 shows a ladder diagram for the ECAD. In this example, 24 volt DC control voltage is used. But AC and other voltages may also be used. A DC power supply 155 provides a hot vertical rail 152 and a common vertical rail 154.

Rung 160 shows the logic of the occupant sensor circuit. The contactor 162 of the occupant sensor 16 is normally open when the elevator cab is empty. When the occupant sensor 16 senses the presence of an occupant in the interior space 26 of an elevator cab, contactor 162 is closed, thereby energizing the coil 164 that operates the contactor 158 of an occupant relay 159, FIG. 5. The occupant sensor may require an intermediate signal conditioner 166, FIG. 4C, which activates contactor 162 upon receiving a signal from the occupant sensor, and is wired between the occupant sensor and the contactor 162.

Rung 170 shows the logic of the elevator door position sensing circuit. The elevator door position sensor 72 shown in FIG. 2 sends an elevator door closed signal when the elevator door is closed and an elevator door open signal at other times. When the elevator door position sensor 72 senses that the elevator doors are closed, it sends an elevator door closed signal, closing contactor 172, thereby energizing the coil 174 that operates the contactor 156 of door relay 157, FIG. 5. The elevator door position signals are typically discrete signals. For instance the elevator door open signal may be an open circuit and the elevator door closed signal may be a closed circuit, or vice versa. Alternatively, the elevator door open signal may result in an electrical transmission while the elevator door closed signal may result in no electrical transmission, or vice versa. Other types of signaling may also be used.

Rung 200 shows the timer circuit. A dual timer 202 is wired in series with the contactor 156 of the door relay 157 and with the contactor 158 of the occupant relay 159. The dual timer 202 has a first timer 204 with a first contactor 208 for controlling a first elevator cab accessory and a second timer 206 with a second contactor 210 for controlling a second elevator cab accessory. In the embodiment described here, the first elevator cab accessory is at least one light and the second elevator cab accessory is at least one fan. Other accessories may be controlled. Additionally, the ECAD may use one timer to control one elevator cab accessory, or it may use one timer to control multiple accessories. The timers 204 and 206 are activated when the contactor 156 of the door relay 157, wired normally open, is closed by an energized coil 174 of the door relay 157 and when the contactor 158 of occupant relay 159, wired normally closed, remains closed as long as the occupant sensor does not detect an occupant in the interior space 26 of the elevator cab. As such, the occupant sensor 16 and the elevator door position sensor 72 communicate with the first and second timers.

The first and second timers may also provide a delay between the time they receive an empty elevator signal from the occupant sensor 16 and an elevator door closed signal from the elevator door position sensor 72 and the time they turn the fan and the light off. This delay prevents the light and fan from being cycled rapidly during periods of high elevator usage. The delay is typically between about 5 and 20 minutes. The timer can also be programmed to keep the fan and light on during periods of frequent elevator usage.

The first and second timers may also include a function that cycles the light or the fan for a predetermined amount of time during periods of elevator inactivity during which the elevator door position sensor continues to send an elevator door closed signal and the occupant sensor continues to send an empty elevator signal. For example, one may wish to cycle the fan intermittently overnight or during weekends to prevent the interior space 26 of the elevator from becoming musty. The timer may also include a real time clock and calendar that may be programmed to intermittently cycle accessories during typical periods of low elevator usage.

Figure 4A:
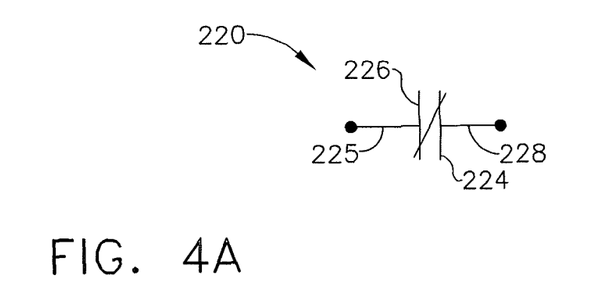
FIG. 4A is a circuit drawing showing the light relay contactor according to the invention.

Rung 190 shows the normally open contactor 208 of the first timer 204 wired in line with the coil 222 of a light relay 220. FIG. 4A shows a hot line 225, typically 120 VAC, that is wired from the load side of a light switch located in the pushbutton control panel box 21 to the line side 226 of a light relay contactor 224 of the light relay 220. A load side 228 of the light relay contactor 224 is wired to the light 12.

Figure 4B:
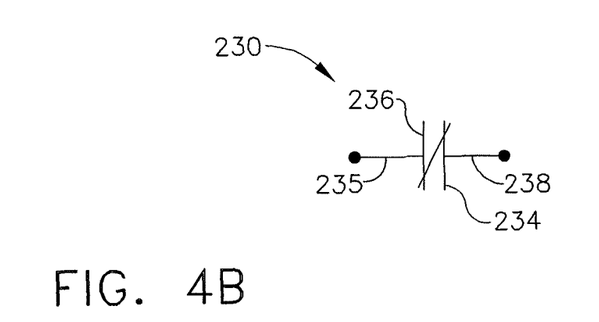
FIG. 4B is a circuit drawing showing the fan relay contactor according to the invention.
Figure 4C:
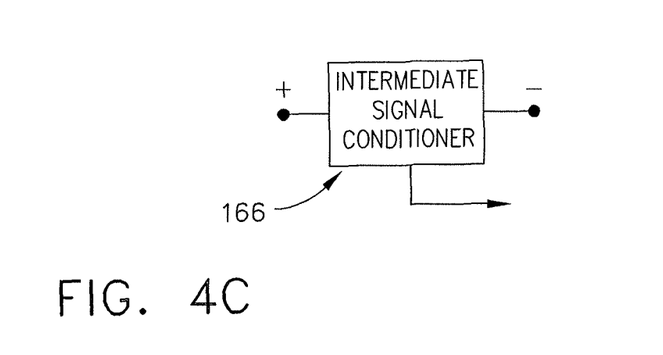
FIG. 4C is a circuit drawing showing a signal conditioner according to the invention.

Rung 180 shows the normally open contactor 210 of the second timer 206 wired in line with the coil 232 of a fan relay 230. FIG. 4B shows a hot line 235, typically 120 VAC, that is wired from the load side of a fan switch located in the pushbutton control panel box 21 to the line side 236 of a fan relay contactor 234 of the fan relay 230. A load side 238 of the fan relay contactor 234 is wired to the fan.

The ECAD may also include a data display, a touch pad for programming the timer or other components, and a system for preventing unauthorized access to the system through a password or other authorization methods, such as a fingerprint identification system. The ECAD may also include a data gathering component communicating with the timers that gathers relevant data such as on time and off time for the light and fan. The data gathering component could gather elevator cab accessory on time and off time data from the light relay contactor 224, the fan relay contactor 234, or from other sources on the control panel 101. The ECAD also have a data analysis unit that could calculate and transmit to the display information such as money saved from accessories being turned off, run hours for accessories, or other information that might be useful to building owners, maintenance personnel, or contractors. Data needed, such as electricity cost per kilowatt hours could be inputted into the data analyzer through the touch pad or other data entry portals. The data gathering unit and the data analysis unit may transmit the data to the data display, or the data may be downloaded to another unit such as a computer from the data gathering unit and the data analysis unit. Additionally, the data may also be sent wirelessly to a remote unit.

The ECAD may also contain override switches that allow a technician to manually turn on or off the light and fan, and it may also contain test buttons that allow a technician to test the ECAD system. The ECAD may also contain a self-test feature that intermittently tests the function of the sensors by comparing sensor signals. For example, the ECAD, after receiving a number of elevator door open signals from the elevator door position sensor over a period of time, may run a self-test to ensure that the occupant sensor has sent an occupied signal during the same period. If the occupant sensor has not sent an occupied signal during that time period, then the occupant sensor may be faulty. An error code may then be sent to the data gathering unit, to the data display, to a computer, or wirelessly to a remote unit. The elevator door position sensor may be tested in the same manner by comparing signals from the occupant sensor to signals from the elevator door position sensor. Also, the ECAD may contain a battery backup to support continued data and programming storage in the event of a power outage.

In operation, a user in calls an elevator by pushing a floor selection button located adjacent the exterior elevator doors at an elevator stop. When the elevator reaches the user and the elevator doors 68, 70 start to open, the elevator door position sensor 72 will detect that the elevator doors are opening, causing the contactor 172 to open, de-energizing the coil 174, opening the contactor 156, and thereby causing the first timer 202 and the second timer 206 to drop out. When the first timer 202 and second timer 206 drop out, the first contactor 208 of the first timer and the second contactor 210 of the second timer open, de-energizing the light coil 222 and the fan coil 232, resulting in the light relay contactor 224 and the fan relay contactor 234 returning to their normally closed position. The light and the fan are then turned on.

When the user enters the elevator and the elevator door position sensor senses that the elevator doors are closed, the contactor 156 closes. But the timers are not energized, because the occupant sensor 16 detects an occupant in the elevator, energizing the coil 164 and opening the normally closed contactor 158. Thus, the timers do not start counting while the elevator interior space is occupied.

When the occupant exits the elevator and the elevator doors close, contactor 156 is closed by way of the elevator door position sensor 72, and the contactor 158 remains closed, because the occupant sensor 16 does not detect an occupant. Thus, the first and second timers start counting. The first timer, after running for the predetermined amount of time, closes the light contactor 208, energizing coil 222 of light relay 220, and thereby opening the light relay contactor 224 and turning the light off. The second timer, after running for the predetermined amount of time, closes the fan contactor 210, energizing coil 232 of fan relay 230, and thereby opening the fan relay contactor 234 and turning the fan off.

The normally closed position of the light relay contactor 224 and the fan relay contactor 234, as shown in FIGS. 4A and 4B, creates a light on and fan on condition if the ECAD circuitry fails or if the occupant or elevator door position sensor fails.

Figure 5:
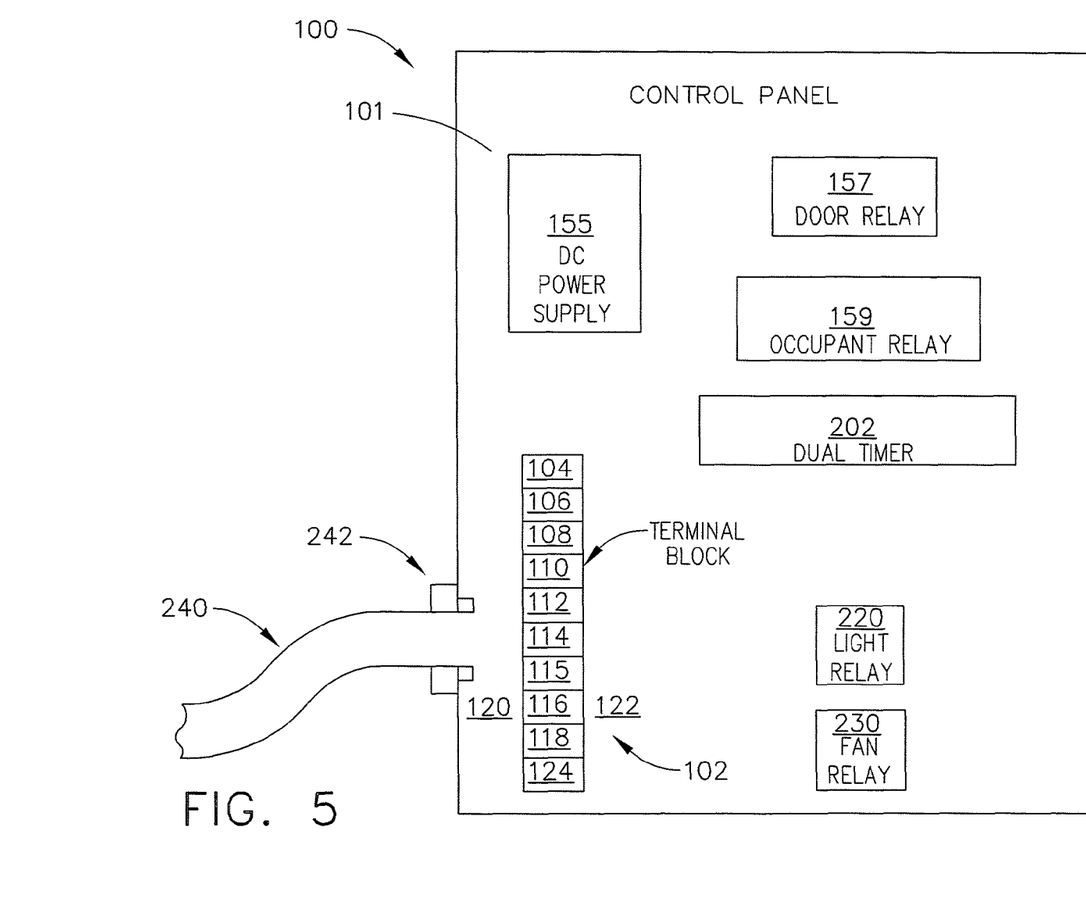
FIG. 5 is a drawing showing the control box and components of the invention.

FIG. 5 depicts a typical control box 100 for an ECAD. The control box 100 contains a control panel 101 having DC power supply 155 for providing low voltage control power for the sensors and circuitry, door relay 157, occupant relay 159, dual timer 202, light relay 220, and fan relay 230. A terminal block 102 holds a plurality of terminals, all of which have a first side 120 and a second side 122. The load side of a light switch, which is typically located in the pushbutton control panel box 21, is wired to the first side 120 of terminal 104. The second side 122 of terminal 104 is wired to the supply side of the DC power supply 155 and to line side 226 of light relay contactor 224 of the light relay 220. FIG. 4A. Thus, the powered line from the light switch provides the control power for operating the sensors, timers, and relays via the DC power supply 155. The load side of a fan switch, which is typically located in the pushbutton control panel box 21, is wired to the first side 120 of terminal 106, and the second side 122 of terminal 106 is wired to the line side 236 of the fan relay contactor 234, FIG. 4B.

The input line to the elevator door position sensor is wired to the first side 120 of terminal 108. The second side 122 of the terminal 108 is wired to a first side of the contactor 172 of the door relay 156. An elevator door position sensor signal transmission line, which returns a signal to the control panel relating to the elevator door position, is wired to the first side 120 of a terminal 112, and the second side of contactor 172 is wired to the second side 122 of terminal 112.

The occupant sensor 16 typically requires power to operate. Thus, a positive voltage control power wire from the DC power supply 155 is wired to the second side 122 of terminal 110, and the first side 120 of terminal 110 is wired to the power supply line of the occupant motion sensor 16. A terminal 124 is provided for terminating commons, such as the common from the DC power supply 155 and a common from the occupant sensor. An occupant sensor signal transmission line, which returns a signal to the control panel relating to whether an occupant is in the elevator cab, is wired to the first side 120 of a terminal 115, and a contactor 162 is wired to the second side 122 of terminal 114.

The load side 228 of the light relay contactor 224 of the light relay 220 is wired to the second side 122 of terminal 115. The first side 120 of terminal 115 is wired to at least one elevator light 12 to provide power to the elevator light when the light relay contactor 224 is closed. The load side 238 of the fan relay contactor 234 of the fan relay 230 is wired to the second side of terminal 116, and the first side 120 of terminal 116 is wired to the elevator fan 14 to provide power to the elevator fan when the contactor 234 is closed.

The control box 100 may be constructed of metal, plastic, or other material suitable for the working conditions of an elevator. Typically, flexible conduit 240 contains the wires running to and from the light, light switch, fan, fan switch, and sensors. The flexible conduit 240 is connected to the control box 100 with a connector 242. While FIG. 5 shows a single flexible conduit 240, multiple flexible conduits may also be used. Additionally, rigid conduit or no conduit may be used.

A typical installation process for the ECAD will now be described. The internals of the control panel 101 are typically wired off-site at a manufacturing facility and may include a printed circuit board. To install the ECAD, a suitable location for the control box 100 is first determined. By mounting the control box 100 containing the control panel 101 to the top of the elevator, in the pushbutton control panel box 21, if space permits, or at any other location on the elevator cab deemed appropriate, the control panel 101 is affixed to the elevator cab. The control box 100 is typically affixed with bolts or screws. The control panel 101 may also be affixed directly to the elevator cab without using a control box 100. For instance, if the control panel 101 is affixed in the pushbutton control panel box 21, then a control box 100 may not be needed. The occupant sensor 16 is then affixed to the elevator cab. Depending on the type of occupant sensor used, it may be installed in the ceiling of the elevator cab, in a wall of the elevator cab, or adjacent to the elevator doors. Then, the elevator door position sensor is installed adjacent to the drive wheel 56, and the sensor activator 76 is affixed to the drive wheel 56. As discussed previously, other types of sensors that will detect the elevator door position may also be used. The wires from the elevator door position sensor 72 and the occupant sensor 16 are then connected to the plurality of terminals on the terminal block 102 located on the control panel 101, as described previously.

The ECAD it typically used on previously installed elevators, and it may also be used on new elevators. By using sensors independent of sensors that may have been installed previously on the elevator, the technician does not have to tie into existing elevator control wiring. Tying into existing elevator control wiring may involve considerable technician time to identify appropriate wires, especially due to the various models of elevators in the market. In addition, there is an added risk that tying into existing wiring could negatively affect the elevator operation.

The control panel 101 is then wired to the light and fan. The light and fan of an elevator typically continuously operate and are controlled by mechanical switches located behind the pushbutton control panel 20 in the pushbutton control panel box 21, which is only accessible when the pushbutton control panel 20 is opened with a special key. This limited access prevents unauthorized persons from turning off the elevator light or fan. To wire the light to the control panel 101, the technician disconnects the wire running from the light switch to the light, wires the load side of the light switch to the first side 120 of terminal 104, and wires the light to the first side 120 of terminal 116. To wire the fan to the control panel 101, the technician disconnects the wire running from the fan switch to the fan, wires the load side of the fan switch to the first side 120 of terminal 106, and wires the fan to the first side 120 of terminal 118.

To protect the elevator electrical system and the technician, power to the elevator should be turned off before wiring the ECAD. After the wiring is complete, the technician turns the fan and light switches located in the pushbutton control panel box 21 on, providing power necessary to operate the ECAD system.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. The invention is therefore not limited to the specific details, representative apparatus and method, and illustrated examples shown and described. Accordingly, departures may be made from such details without departing from the scope or spirit of the invention.

What is claimed is:

1. An elevator cab accessory device comprising
   a control panel having a first timer and a first contactor, whereby the first timer operates the first contactor,
   an elevator door position sensor communicating with the first timer, and an occupant sensor communicating with the first timer, wherein the first timer operation is controlled by the elevator door position sensor and the occupant sensor, and
   a first elevator cab accessory communicating with the first contactor, whereby the first elevator cab accessory operation is controlled by the first contactor.

2. The elevator cab accessory device according to claim 1, wherein the elevator door position sensor communicates with a drive wheel for determining elevator door position.

3. The elevator cab accessory device according to claim 1, wherein the elevator door position sensor communicates with at least one elevator door for determining elevator door position.

4. The elevator cab accessory device according to claim 1, wherein the first elevator cab accessory is at least one light.

5. The elevator cab accessory device according to claim 1, wherein the first elevator cab accessory is at least one fan.

6. The elevator cab accessory device according to claim 1, wherein the control panel has a second timer and a second contactor, whereby the second timer operates the second contactor and wherein the second timer operation is controlled by the elevator door position sensor and the occupant sensor, the elevator cab accessory device further comprising a second elevator cab accessory communicating with the second contactor, whereby the second elevator cab accessory operation is controlled by the second contactor.

7. The elevator cab accessory device according to claim 6, wherein the first elevator cab accessory is at least one light.

8. The elevator cab accessory device according to claim 7, wherein the second elevator cab accessory is at least one fan.

9. A method for controlling at least one elevator cab accessory comprising
   receiving an elevator door closed signal from an elevator door position sensor,
   receiving an empty elevator signal from an occupant sensor,
   starting a first timer upon receiving the elevator door closed signal from the elevator door position sensor and the empty elevator signal from the occupant sensor, and
   turning off a first elevator cab accessory after the first timer has counted a predetermined amount of time while continuing to receive the elevator door closed signal and the empty elevator signal.

10. A method for controlling at least one elevator cab accessory according to claim 9, wherein the first elevator cab accessory is at least one light.

11. A method for controlling at least one elevator cab accessory according to claim 9, wherein the first elevator cab accessory is at least one fan.

12. A method for controlling at least one elevator cab accessory according to claim 9, further comprising
    starting a second timer upon receiving the elevator door closed signal from the elevator door position sensor and the empty elevator signal from the occupant sensor, and
    turning off a second elevator cab accessory after the second timer has counted a predetermined amount of time while continuing to receive the elevator door closed signal and the empty elevator signal.

13. A method for controlling at least one elevator cab accessory according to claim 12, wherein the first elevator cab accessory is at least one light and the second elevator cab accessory is at least one fan.

14. A method for controlling at least one elevator cab accessory according to claim 12, further comprising cycling the second elevator cab accessory on for a predetermined amount of time while continuing to receive the elevator door closed signal and the empty elevator signal.

15. A method of installing a controller for at least one elevator cab accessory comprising
    affixing a control panel having a first timer to an elevator cab,
    affixing an elevator door position sensor to an elevator cab and wiring the elevator door position sensor to the control panel,
    affixing an occupant sensor to an elevator cab and wiring the occupant sensor to the control panel,
    providing a wire to the control panel for powering the control panel and at least one elevator cab accessory, and
    wiring the at least elevator cab accessory to the control panel.

16. The method of installing a controller for at least one elevator cab accessory according to claim 15, wherein the elevator cab is an elevator cab of a previously installed elevator.

17. The method of installing a controller for at least one elevator cab accessory according to claim 15, wherein the elevator door position sensor and the occupant sensor are independent of existing elevator sensors.

18. The method of installing a controller for at least one elevator cab accessory according to claim 15, wherein the control panel has a second timer and further comprising wiring a second elevator cab accessory to the control panel.

19. The elevator cab accessory device according to claim 1, wherein the elevator door position sensor is independent of previously installed sensors.

20. The method of installing a controller for at least one elevator cab accessory according to claim 15, wherein the elevator door position sensor is independent of all previously installed elevator door position sensor.

* * * * *